US007876785B2

(12) United States Patent
Lautenschlaeger (10) Patent No.: US 7,876,785 B2
(45) Date of Patent: Jan. 25, 2011

(54) TRANSPORT OF AGGREGATED CLIENT PACKETS (75) Inventor: Wolfram Lautenschlaeger, Sachsenheim (DE)

(73) Assignee: Alcatel Lucent, Paris (FR)

( * ) Notice: Subject to any disclaimer, the term of this patent is extended or adjusted under 35 U.S.C. 154(b) by 28 days.

(21) Appl. No.: 12/316,285

(22) Filed: Dec. 11, 2008

(65) Prior Publication Data
US 2009/0154475 A1 Jun. 18, 2009

(30) Foreign Application Priority Data
Dec. 17, 2007 (EP) .................... 07291541
Apr. 28, 2008 (EP) .................... 08155314

(51) Int. Cl.
H04J 3/24 (2006.01)
H04J 3/06 (2006.01)
H04L 12/56 (2006.01)

(52) U.S. Cl. .............. 370/473; 370/474; 370/252; 370/503; 370/535

(58) Field of Classification Search ............... 370/400, 370/473, 468, 252, 474, 503, 535; 709/247
See application file for complete search history.

(56) References Cited
U.S. PATENT DOCUMENTS 6,728,270 B1 * 4/2004 Meggers et al. ............. 370/514
6,801,545 B2 * 10/2004 Stewart ...................... 370/473
6,813,259 B1 11/2004 Kumar et al.
6,907,042 B1 * 6/2005 Oguchi ....................... 370/412
7,301,948 B2 * 11/2007 Omae et al. ................. 370/392
7,376,141 B2 * 5/2008 Rosengard et al. .......... 370/412
7,391,760 B1 * 6/2008 Caldwell et al. ............ 370/352
7,463,642 B2 * 12/2008 Qian .......................... 370/432
7,697,571 B2 * 4/2010 Zimmermann .............. 370/503
7,822,075 B2 * 10/2010 Liu ............................ 370/539
2003/0126294 A1 * 7/2003 Thorsteinson et al. ....... 709/247
2004/0156390 A1 8/2004 Prasad et al.
2004/0252720 A1 * 12/2004 Xiong et al. ................. 370/473

FOREIGN PATENT DOCUMENTS
EP 1089498 A 4/2001
EP 1455494 A 9/2004

* cited by examiner

Primary Examiner—Kwang B Yao
Assistant Examiner—Candal Elpenord
(74) Attorney, Agent, or Firm—Carmen Patti Law Group, LLC (57) ABSTRACT The invention relates to a method for transmitting one or more client signals via a packet transport network. According to the method, packets of the one or more client signals are received at an ingress node of the network. Timing information characterizing the timing of the received packets is determined and the received packets are mapped into a container. The container and the timing information are transmitted via the network. At an egress node of the network, the packets are extracted from the container and the packets are timed for further transmission based on the transmitted timing information.

13 Claims, 3 Drawing Sheets

TRANSPORT OF AGGREGATED CLIENT PACKETS

The invention is based on the priority applications EP08155314.1 and EP07291541.6, which are hereby incorporated by reference.

FIELD OF THE INVENTION

The invention relates to optical communication, in particular to a method of transmitting aggregated packets of one or more client signals via a packet transport network. Further, the invention relates to network elements for such packet transport network and to a packet transport network as such.

BACKGROUND OF THE INVENTION

In packet networks, the elements of the triplet of packet size, data rate and forwarding delay are intrinsically tied to each other. Packets, e.g. Ethernet packets, are typically well adapted in size for the needs of end user applications, in particular for providing a forwarding delay acceptable for the application. At the typical data rates of the end user, the packet size is dimensioned to produce forwarding delays below the human temporal perception horizon. E.g. an Ethernet packet having a size of 1000 bytes takes 125 ms to be filled by voice call data having a data rate of 64 kbit/s, thereby producing a forwarding delay in the range of 125 ms. Thus, applications running at a small end user data rate favor small packet sizes, thereby reducing the forwarding delay to be below the human temporal perception horizon.

In core networks the additional packet-size dependent forwarding delay of packets is lower due to the speed-up from application data rate to core data rate. However, applications (in particular applications with high data rate as video streaming applications having e.g. a data rate of 10 Mbit/s) cannot take benefit from this small forwarding delay because of other delay contributions. E.g. the fiber propagation delay of a span of 1000 km in a core network is in the range of 5 ms (independent of the packet size), whereas in a node of such core network, the packet-size dependent forwarding delay of a packet having a size of 1000 bytes is as low as 1 μs, much lower than all other delay contributions. Thus, the overall additional forwarding delay in the core network is not dominated by the small packet-size dependent forwarding delay in the core network but mostly determined by other delay contributions. The small packet-size dependent forwarding delay in the core network would allow also larger packet sizes. However, as discussed above, typically the packet size is determined by the needs of the user application.

Protocol packets may have even smaller packet sizes. Among the smallest packets is the widely used TCP (transmission control protocol) ACK packet having a size of 64 bytes. This packet is used for acknowledging receipt of a packet in TCP and cannot be avoided in the existing Internet practice.

At the high speed core network, the client traffic is aggregated by volume, nonetheless each individual client packet is forwarded individually in the core. Thus, packet granularity does not change from end user application to the core network. At an ingress node of the core network, each client packet may be separately encapsulated for transmission via the core network by the use of 1:1 encapsulation techniques like T-MPLS (Transport Multiprotocol Label Switching), PBB (Provider Backbone Bridge) or MAC-in-MAC, i.e. one Ethernet packet may be encapsulated in another Ethernet packet. The encapsulated packet is opaque, i.e. not visible for the core network.

At the high data rate in the core network, the immutable packet size as determined by the user application is much too small for efficient transport of the same packet (or 1:1 encapsulated in another packet) in the core network since the header of each packet is processed in the core network. The higher the line rate of the core network, the higher is the effort for header processing. Moreover, the packet processing capabilities of the core network elements have to be designed to be sufficient even in the worst case of maximum load and smallest packet size. Such scenario is unlikely to happen but cannot be safely excluded. Thus, in core network line cards for 10 Gbit/s, 100 Gbit/s and above, e.g. for 100 Gbit/s Ethernet, the header processing of the packets is the most power and silicon area consuming task.

A well known approach for reducing the effort of header processing is the aggregation of smaller size packets into larger size containers, e.g. in optical burst switching (OBS) burstification of packets into larger containers (also called burst or frames) is used. At a network ingress node, packets with the same destination are accumulated and aggregated into a container which in turn is moved as an opaque entity through the core network. Only at the respective network egress node, the container is unloaded and the contained packets are released to the client network. In OBS the aggregation of packets into a container is necessary because of the low switching speed of optical devices. Without aggregation, the optical devices would have to be switched packet-wise which is not possible. In case of electronic or opto-electronic switching the concept of accumulating packets and aggregating the accumulated packets into a container can be also reused for a reduction of the packet count per second in core switches.

SUMMARY OF THE INVENTION

The process of aggregation into a container and de-aggregation of such container results in at least two deficiencies:

1. In case of low load, initially (i.e. before aggregation) well separate sparse packets may be lumped together in bursts of packets after transmission via the core network since the timing of packets in a container is lost. This causes problems for lower-order networks downstream of the egress-node of the core network.
2. Variable traffic load at the ingress node of such core network further results in variable accumulation times for accumulating packets for a container. This uncertainty in the accumulation time results in temporal variations of the delay between containers and thus in large jitter of the packet arrival after de-aggregation. Such jitter is e.g. a problem for steaming applications that need constant packet time distances.

In the following the problem of a high burstiness of the packets flow after de-aggregation is discussed in detail.

In a hierarchical network having lower speed access networks at the boundaries and a high speed core network in between, the timing of packet flows is a crucial parameter. Typically, the packet flow is naturally shaped by the originating network. The temporal distance between packets ensures that the transmission does overload neither the originating network nor the receiving network. The core network should preserve the timing of the packet flow, independently of the load by other traffic and without explicit knowledge of the individual flows. This is ensured by using queuing and scheduling schemes like Weighted Fair Queuing (WFQ) or Weighted Round Robin (WRR).

For transmitting the client packets via the high speed core network, the fine grained packets of the client signals are typically encapsulated into larger transport containers, e.g. in the case of SDH (Synchronous Digital Hierarchy as defined in ITU-T G.701), SONET (Synchronous Optical Networking as defined in GR-253-CORE from Telcordia) or OTN (Optical Transport Network as defined in ITU-T G.709). All these transport protocols have in common that the container is a continuously moving TDM (time-division multiplexing) entity (synchronous traffic), i.e. containers are continuously generated and transmitted according to the data rate of the trans-port protocol, irrespective of the containers' load. The client packets are mapped into the containers on the fly. In case of a sporadic packet stream, the containers are padded by idle patterns as necessary. Thus, the relative timing of packets to each other does not change from an ingress node of such high speed network to an egress node of such network.

This is typically not the case in packet transport networks with packet accumulation and aggregation of accumulated packets in a container, e.g. in burst or frame switched networks. Such networks are still in research and not yet fully standardized. In such networks multiple small client packets are aggregated into large containers to save switching overhead in the network core.

Burst switched network are based on the concept of OBS. In burst switched networks smaller packets of one or more client signals are aggregated into a larger burst which is to be transmitted to a specific egress node. When transmitting the burst via the network, the optical burst switches of the network are switched to forward the individual burst from the ingress node of the network to the respective egress node.

Also, in frame switched networks a plurality of smaller packets of one or more client signals is aggregated into a larger frame. After filling of the frame (which depends on the load), the frame is switched into a synchronous high speed transport stream as an individual entity. The paper "Long term network architectures and scenarios based on optical burst/ packet switching", G. Eilenberger, Proceedings of SPIE, AsiaPacific Optical Communications 2006, September 2006, Gwangju, South Korea, Vol. 6354, discloses in section 3.1 an example of a frame switched network based on a modification of the G.709 standard. This disclosure is hereby incorporated by reference. The frames are switched inside the nodes of the network as separate entities, while the transmission links between the nodes keep the continuous, synchronous transmission pursuant to G.709. At an add/drop multiplexer, the client interface signals are aggregated into an adapted G.709 frame format by a frame aggregation unit. After filing of the frames, the frames are individually switched into the synchronous transport stream, i.e. frames are not periodically switched into the high speed transport stream with a fixed period.

In burst switched networks and frame switched networks a larger size container (i.e. a burst in case of a burst switched network, and a frame in case of a frame switched network) containing multiple client packets is used which normally waits until completion before being transmitted. In turn, completion of the container depends on the actual traffic load. Idle pattern between packets, e.g. in case of low traffic load, are generally not used. The client packets are encapsulated in the container one after another, regardless of the relative timing at the ingress node. Filling pattern may occur only at the end of the container. At the egress node, the encapsulated packets in the container are unloaded and released to the access network (or metro network). However, at this point the original timing between the packets is not available any more. In dependency of the traffic load, the client packets may be lumped together in bursts. This results in a high burden on the downstream network buffers. In particular in case of low traffic load, a high burstiness of the packet flow at the egress node may easily occur. Such high burstiness did not exist when the packets entered the ingress node.

This problem is explained in more detail with reference to FIGS. 1 to 3.

Figure 1:
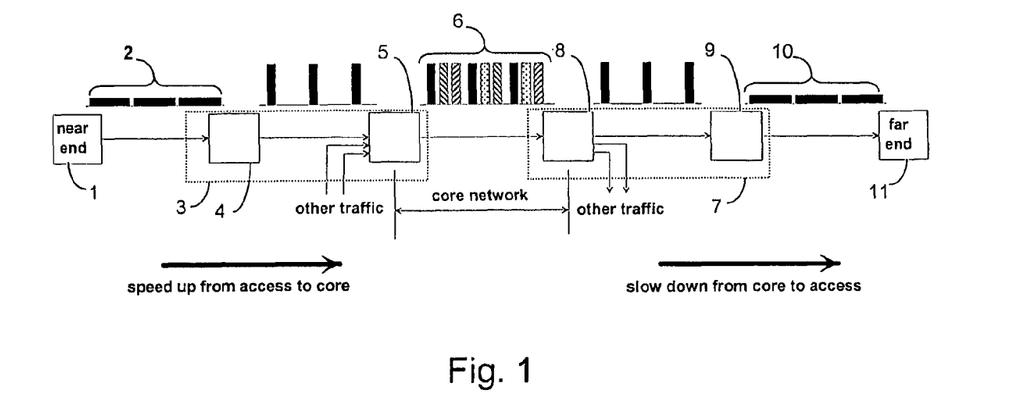
FIG. 1 illustrates the client packet flow in a conventional hierarchical network having a conventional high speed core network.

FIG. 1 illustrates the client packet flow in a conventional hierarchical network having a conventional synchronous high speed core network (e.g. an SDH network) and one or more lower speed access or metro networks at the boundaries. Typically, the lower speed access networks are connected to even lower order distribution networks. From a transmitting node (near end) 1, e.g. located in a company network, a lower data rate client signal 2 is transmitted via an access network to an ingress node 3 of a high speed core network. Due to the lower data rate the packets of the signal 2 have a relative long duration as indicated in FIG. 1. The ingress node 3 provides means 4 for reducing the packet duration (by increasing the data rate) and multiplexing means 5 for multiplexing the packets together with other client signals into a continuous high speed trans-port signal 6, e.g. a 10-Gbit/s SDH signal. Although illustrated as separate units, typically both means 4 and 5 are realized within a single unit. After transmission via the core network to an egress node 7, the process is reversed, i.e. the received high speed transport signal 6 is demultiplexed by demultiplexing means 8 into various client signals and the packet duration of the demultiplexed signal is increased by appropriate means 9. From the egress node 7 the client signal 10 is forwarded to the destination via a lower speed access network and other lower order distribution networks. The far end 11—as illustrated in FIG. 1—describes one of the last intermediate nodes (e.g. a floor distributor or a DSL access multiplexer) before the destination, where problems may occur in case of burstiness of the packet flow, i.e. the far end 11 represents the bottleneck behind the egress node 7. However, as illustrated in FIG. 1, the flow of received packets of the signal 2 at the ingress node 3 corresponds to the flow of forwarded packets of the signal 10 at the egress node 7, i.e. the flow shape is preserved and no problems occur.

Figure 2:
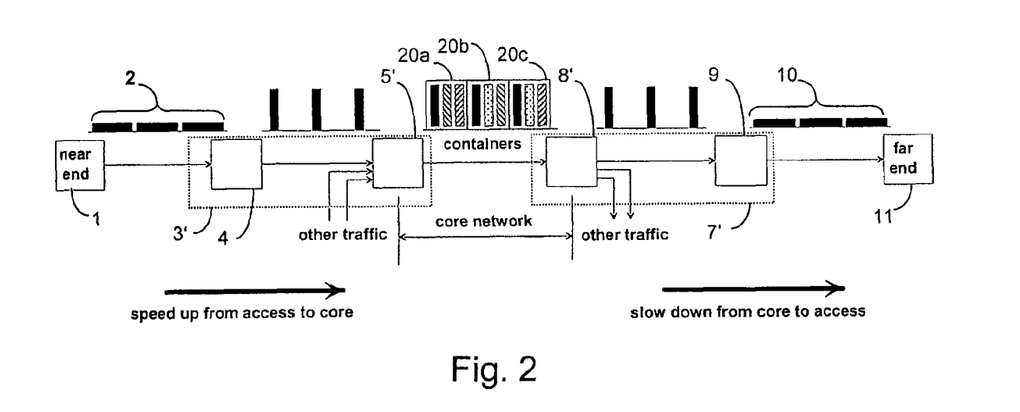
FIG. 2 illustrates the client packet flow in a hierarchical network having a packet transport network with packet aggregation in case of heavy load of the core network.

FIG. 2 illustrates the client packet flow in a hierarchical network having a burst or frame switched core network with load dependent container generation in case of heavy load. Figurative elements in FIGS. 1 and 2 being denoted by the same reference signs are basically the same. In FIG. 2 the multiplexing means 5' are further configured for aggregating the packets of the various client signals into containers 20a-c and the demultiplexing means 8' are also configured for extracting the packets from the containers 20a-c. The client packets are put one after another in the container regardless of the relative timing at the ingress node. In case of heavy load, only a limited number of packets of one client signal (here: one packet per container) is aggregated into one container. After extracting the packets of the client signal 2 at the egress node 7 and adaption of the packet duration in the means 9, the packets are forwarded to the destination. As indicated in FIG. 2, the flow of received packets of the signal 2 at the ingress node 3' essentially corresponds to the flow of forwarded packets of the signal 10 at the egress node 7. Thus, the aggregation into containers does not disturb at all or only negligibly disturbs the flow shape.

Figure 3:
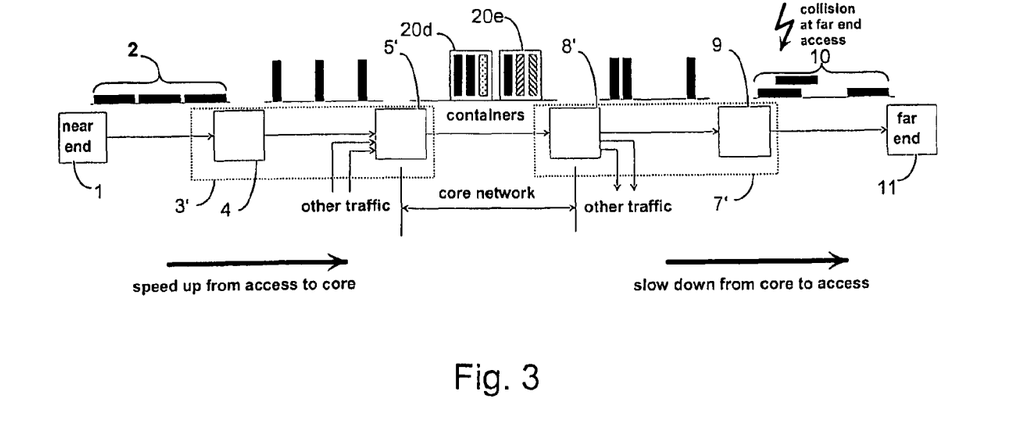
FIG. 3 illustrates the client packet flow in case of low load of the network in FIG. 2.

FIG. 3 illustrates the client packet flow in case of low load of the network in FIG. 2. Figurative elements in FIGS. 2 and 3 being denoted by the same reference signs are basically the same. Due to the low load in FIG. 3, more packets of the client signal may be aggregated into one container, e.g. two packets of the client signal 2 may be aggregated into the first container 20d. After extracting the packets of the client signal 2 at the egress node 7' and adaption of the packet duration in the means 9, the packets are lumped together, stressing the low speed link at the far end 11. Such high burstiness of the flow at the egress node 7 puts a burden on the downstream network buffers as the burstiness causes temporary overload at the far end. This is even worse since the smallest buffers are typically installed in access or even customer owned switches near to the destination host which is far away from and unaware of the container switched transport network. In consequence, aggregation of packets in a container of such network causes not only a modification of the traffic shaping but problems at the far end of the connection, far away from the real root cause with low chance for proper mitigation.

Hence, it is an object of the present invention to provide a method for transmitting client packets via a packet transport network, with the method allowing for reduced header processing capabilities. The method should overcome the problem of high burstiness of the flow at the egress node as discussed above. It is a further object of the present invention to provide corresponding network elements for the ingress and egress nodes of such packet transport network and to provide such network as such.

A first aspect of the invention relates to a method for transmitting one or more client signals (e.g. Ethernet signals or IP/PPP—Internet Protocol/Point-to-Point Protocol signals) via a packet trans-port network.

The method proposes an aggregation, in particular a load dependent aggregation, of multiple packets into a larger container (e.g. an Ethernet jumbo frame) at the ingress node of the packet transport network in combination with measures for reproducing the client flow timing at the egress node.

In the nodes in between only the container headers and not the packet headers may be processed. Thus, only the headers of the containers and not the headers of the encapsulated packets are visible to the core network. Such aggregation may reduce the worst case packet header processing (e.g. for 10 Gbit/s or 100 Gbit/s Ethernet links) at least by a factor of 100.

The invention addresses problems due to aggregation (e.g. traffic shaping, jitter introduction and general timing problems) by providing measures for reproducing the client flow timing at the egress node, in particular independently of the actual traffic load and its variations. Thus, the concept of container aggregation as discussed in academic research can be used in productive networks, without negative impact to the access and application layers.

By determining timing information of the received packets at the ingress node and transmitting this timing information via the packet transport network, the original relative packet timing of the packets in a container may be reconstructed at the core network.

The header count may be limited to an essentially constant (i.e. independent of the actual traffic) low level. In case of low load e.g. only 1 or 2 packets are contained in a container, whereas in case of high load many packets are encapsulated in a container. In both cases, the core network has only to process the header of the container, irrespective of the container load. This reduces the header processing effort in the transport network, in particular in the switches of the transport network. Thus, the header processing power of the network elements in the transport network may be reduced or at the same processing power the gross throughput can be increased.

According to another aspect of the invention, packets of the one or more client signals are received and accumulated at an ingress node of the network. Timing information characterizing the timing of the received packets is determined and the received packets are mapped into a container. E.g. the relative distances of packet arrivals are stored together with the packets. The container and the timing information are transmitted via the network. Preferably, the timing information is transmitted as part of the container. At an egress node of the network, the packets are extracted from the container and the packets are timed for further transmission based on the transmitted timing information. The timing may be performed before the packet are extracted from the container, afterwards or simultaneously.

The proposed method provides the advantage that the timing of the received packets is not lost when aggregating the packets into a container. Instead, timing information characterizing the timing of the received packets at the ingress node is determined and transmitted to the egress node. Thus, based on the transmitted timing information, the timing may be restored at the egress node such that the timing of the extracted packets at the egress node essentially corresponds to the timing of the received packets at the ingress node. Thus, high burstiness of the forwarded packet flow at the egress node is avoided, thereby avoiding the problem of temporary overload at the far end. In other words, at the unloading stage the packet arrival process may be mimicked by reestablishing the correct departure distances as stored together with the packets.

The proposed solution solves the problem in a transparent way: it is local to the container aggregation and de-aggregation process, it does not require explicit awareness of the application flow at the core, and it is invisible to the affected far end access link. Thus, the application flow shapes are reproduced without special care to individual flows.

For implementing the inventive method, additional delay, i.e. additional buffer space, for the de-aggregation in the core egress node may be required.

The inventive method uses client packet encapsulation and thus may be applicable to conventional client packet encapsulation schemes like T-MPLS (Transport Multiprotocol Label Switching), PBB (Provider Backbone Bridge) or MAC-in-MAC. Such conventional 1:1 (i.e. one packet per one container) client packet encapsulation schemes may be extended by the inventive method to support multiple packets per container.

The aggregated transport steam may be compliant to standard packet technologies, e.g. Ethernet.

Preferably, the steps of determining the timing information and mapping of the packets are performed by using a modified Generic Framing Procedure (GFP).

In the conventional GFP as defined in ITU-T G.7041, client packets of different types (e.g. Ethernet MAC, IP/PPP) are encoded into a generic frame format, i.e. into GFP client data frames having a GFP core header and a GFP payload area. In detail, a client packet is mapped into a GFP payload area. The GFP client data frames are then mapped into frames of the transport protocol, e.g. an SDH, SONET or OTN frame. GFP idle frames are inserted between the received client packets if there are no GFP frames available for transmission. GFP idle frames are used as a filler frame, thereby facilitating adaption of the GFP stream to any given transport medium, with the transport medium having a higher data capacity than required by the client signal. This provides a continuous stream of frames. The document ITU-T G.7041 of August 2005, in particular the remarks relating to the GFP idle frames, is hereby incorporated by reference.

The number of GFP idle frames between subsequent GFP client data frames and thus between subsequent client packets depends on the timing of the received frames and in turn is a measure for the timing of the client packets as received at the ingress node.

According to a preferred embodiment of the invention, when encoding the received packets by means of a modified GFP, the GFP idle frames between clients packets are left out and left out idle frames between two packets are counted by means of a counter. The numbers of left out idle frames are used as timing information.

Preferably, a data stream essentially pursuant to the conventional GFP is generated, with the data stream having GFP idle frames. The GFP idle frames are removed and the left out idle frames between subsequent GFP client data frames (corresponding to subsequent client packets) are counted. Alternatively, one may count the left out idle frames without prior insertion of GFP idle frames and without subsequent removal of these frames.

Advantageously, each number of left out idle frames is stored in a spare field of a GFP header. Further, preferably, each number of left out idle frames is stored in the GFP client data frame (in particular in its header) directly following the respective left out idle frames.

Preferably, at the egress node, the packets to be forwarded are timed based on the numbers of the left out idle frames. In particular, this may be carried out by inserting GFP idle frames between subsequent GFP frames according to the respective numbers of left out idle frames.

As discussed above, variable traffic load at the ingress node of such network further results in variable accumulation times for accumulating packets to be transmitted in a container. This uncertainty in the accumulation time results in temporal variations of the container arrivals at the egress node and thus in large jitter of packet arrival after de-aggregation.

For overcoming this problem, preferably, it is taken care that the earliest packet for a container waits at the ingress node and at the egress node together for a mandatory time period being essentially constant for the respective earliest packets in different containers. Preferably, the complete time period is divided between the ingress node and the egress node in dependency of the load of the ingress node. E.g. in case of low load, the earliest packet waits for a larger time interval at the ingress node (since the container is filled in a large time interval) and waits for a smaller time interval at the egress node. In contrast in case of heavy load, the earliest packet wait for a smaller time interval at the ingress node (since the container is filled in a small time interval) and waits for a longer time interval at the egress node (to compensate for the shorter time interval at the ingress node). Thus, a variation of the accumulation time at the ingress node due to traffic load is compensated by an inverse variation of the waiting time at the egress node. When e.g. using the modified framing procedure in combination with this idea, the client flow timing may be exactly reproduced, independently of the actual load.

According to a preferred embodiment, each packet mandatorily waits at the ingress node and at the egress node together for a time period being essentially constant for all packets in a container and for packets in different containers. This is the case when the waiting time for the earliest packets in different containers is constant and the timing of the other packets in each container is reconstructed at the egress node in relation to the earliest packet.

A constant delay for any packet, no matter of the actual packet size, density, traffic load or container granularity, is equivalent to a fiber delay on the fiber optic cable. Network applications outside of the container switched core cannot distinguish between both delay contributions.

Preferably, it is monitored whether a predetermined time-out period is reached at the ingress node for the earliest received packet to be transmitted in the respective container. In the worst case, the earliest packet waits at the ingress node up to a time-out period. In case of reaching the time-out period, the container is prepared for transmission, irrespectively whether the container is full. Reaching the time-out period occurs in case of very low load. In case of normal or heavy load, only a portion of the time-out period lapses for the earliest packet when the accumulated packets at the ingress node already reach a predetermined portion of the container capacity (e.g. the full container capacity).

At the ingress node, the container is prepared for transmission when (in case of very low load) the predetermined time-out period is reached for the earliest packet, or when (in case of normal or heavy load) the accumulated packets at the ingress node reach a predetermined portion of the container capacity. At the egress node the earliest packet is timed based on the non-elapsed portion of the time-out period (i.e. the remainder of the time-out period, which may be zero in case of reaching the time-out period) and the remaining packets in the container are timed based on the timing information, thereby reproducing the relative timing of the packets in the container to each other. It should be noted that the earliest packet is not mandatory released for transmission after exactly waiting for the non-elapsed portion of the time-out period. The earliest packet may be released later with an additional delay, constant for all packets.

The total waiting time for the earliest packet may be the result of the lapsed portion of the time-out period (corresponding to the waiting time or the accumulation time at the ingress node) plus the non-lapsed portion of the time-out period (corresponding to the waiting at the egress node). As a matter of course, the total waiting time for the earliest packet may be increased by a constant delay e.g. at the egress node.

According to a preferred embodiment, at the ingress node, the packets are accumulated in a first buffer, e.g. in a first FIFO buffer (First In, First Out). At the egress node, the content of the received container is stored in a second buffer, e.g. in a second FIFO buffer.

Accordingly, preferably it is taken care that the earliest packet for a container waits in the first and second buffers together for a mandatory time period being essentially constant for the respective earliest packets in different containers. More preferably, each packet mandatorily waits in the first and second buffers together for a time period being essentially constant for all packets in a container and for packets in different containers.

Preferably, it is monitored whether the predetermined time-out period is reached for the earliest packet in the first buffer (i.e. the first packet in a FIFO buffer) to be transmitted in a respective container. Also, it is monitored whether the first buffer reaches a predetermined filing size (e.g. a filling size corresponding to the maximum container payload size).

The content of the first buffer is prepared for transmission (e.g. storing the first buffer's content in a container frame, storing the arrival distances between packets together with the packets in container and storing the non-lapsed portion of the time-out period in the container) when a predetermined time-out period has lapsed for the earliest packet (in case of very low load) or when the first buffer reaches the predetermined filing size (in case of normal or heavy load).

The earliest packet is released from the second buffer at the egress node timed based on the non-elapsed portion of the time-out period (i.e. based on the remainder of the time-out period). Thus, variations of the accumulation time at the ingress node are compensated by inverse intentional variations of the time for releasing at the egress node. The remaining packets in the container are released from the second buffer timed based on the timing information, thereby reproducing the relative timing of the packets to each other. It should be noted that "timed based on the non-elapsed portion of the time-out period" does not mean that the earliest packet is necessarily released for transmission immediately after waiting for the non-elapsed portion of the time-out period. The earliest packet may be released later with an additional delay, with the delay being constant for all packets.

Advantageously, also timing information relating to the earliest packet is determined at the ingress node and transmitted via the network. The transmitted timing information related to the earliest packet may indicate the non-elapsed portion of the time-out period. The timing information of the earliest packet may be set to the non-elapsed portion of the time-out period. Such non-elapsed portion may be zero if the time-out period has been reached.

According to a preferred embodiment, the container is an Ethernet jumbo frame. According to IEEE 802.3, Ethernet frames have a maximum size of 1518 bytes (1500 bytes in case of IP). Jumbo frames are all Ethernet frames exceeding this size of 1518 bytes (1500 bytes), e.g. Ethernet frames having a size of 9.6 kbyte or even higher.

The invention may be used for 10 or 100 Gbit/s Ethernet transport networks. 100 Gbit/s will be a pure transport technology, applications are not expected to operate at 100 Gbit/s. Thus, potentially all 100 Gbit/s Ethernet products may benefit from this invention.

It should be noted that the above mentioned embodiments of the invention can be arbitrarily combined. In particular, the concept of encoding the client packets by the modified Generic Framing Procedure may be combined with the concept of providing a constant waiting time at the ingress and egress nodes. Furthermore, it should be noted that the disclosure of the invention also covers other claim combinations than the claim combinations which are explicitly given by the back references in the dependent claims, i.e. the claims can be basically combined in any order.

Another aspect of the invention relates to a network element for an ingress node of a packet transport network. The network element is configured to receive and accumulate packets of one or more client signals to be transmitted via the network. The network element comprises determining means for determining timing information characterizing the timing of the packets. Further, mapping means for mapping the received packets into a container are provided. Also, the network comprises transmitting means for transmitting the container and the timing information via the network.

Yet another aspect of the invention relates to a network element for an egress node of such network. The network element is configured for receiving a container as mapped by the network element according to the second aspect of the invention. The network element for the egress node comprises extracting means for extracting the packets from the container and timing means for timing the packets for further transmission based on the timing information.

Yet another aspect of the invention relates to a packet transport network. At an ingress node of the network, the network comprises a first network element according to the second aspect of the invention. At an egress node of the network, the network comprises a second network element according to the third aspect of the invention. The network may comprise additional network nodes, in particular switching nodes between the ingress and the egress nodes; however, such additional network nodes are not mandatory. The network elements at the ingress and egress nodes use the same encapsulation format. This encapsulation format may be standardized, either in a corporate standard or in a public standard. The network switches in the transport network need not necessarily know the particular encapsulation format as long as the switches know the container format itself, e.g. an Ethernet jumbo frame.

The above remarks relating to the method according to the first aspect of the invention and its preferred embodiments are also applicable to the network elements and the network according to the second to fourth aspects of the invention.

BRIEF DESCRIPTION OF THE DRAWINGS

The invention is explained below in an exemplary manner with reference to the accompanying drawings, wherein.

DETAILED DESCRIPTION OF THE INVENTION

Figure 4:
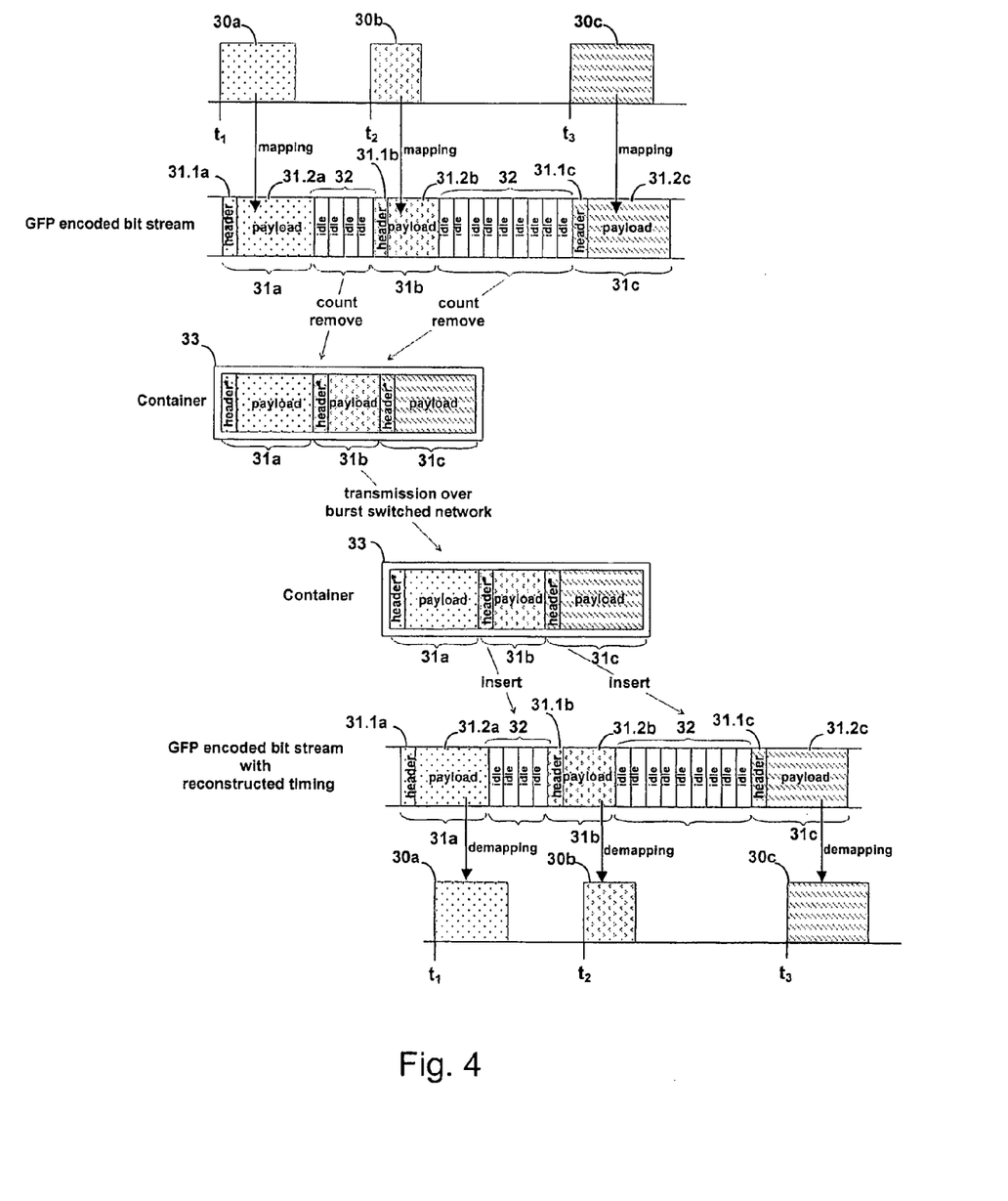
FIG. 4 illustrates a first embodiment of the inventive method.

FIGS. 1 to 3 were already discussed above. FIG. 4 illustrates a first embodiment of the inventive method of transmitting client signals via a packet transport network with packet aggregation, e.g. a burst switched network. The method is implemented by means of an extension of the standard Generic Framing Procedure (GFP) as will be explained in the following.

Client packets $30a$, $30b$, $30c$ arrive at an ingress node of the network, e.g. at various times $t_1$, $t_2$ and $t_3$. In FIG. 4, the client packets $30a$, $30b$, $30c$ relate to different client signals. The client packets $30a$, $30b$, $30c$ may be, e.g. Ethernet frames and/or IP/PPP frames.

The client packets $30a$, $30b$, $30c$ are encoded to a GFP encoded bit stream, i.e. the packets $30a$, $30b$, $30c$ are mapped to GFP client data frames $31a$, $31b$, $31c$. Further, GFP idle frames 32 are placed between the GFP client data frames $31a$, $31b$, $31c$ to compensate for the gaps between the client packets $30a$, $30b$, $30c$.

Two mapping modes exist in GFP: frame-mapped GFP (GFP-F) as used in FIG. 4 and transparent-mapped GFP (GFP-T).

In GFP-F the essentially entire client packet is mapped into a GFP client data frame, whereas in GFP-T multiple 8B/10B block coded client data streams are mapped to a GFP frame. GFP-F is typically used for Ethernet or IP/PPP client signals, whereas GFP-T is applied in case of Fiber Channel, ESCON (Enterprise Systems Connection) or FICON (Fiber Connectivity) client signals.

Each GFP client data frame $31a$, $31b$, $31c$ comprises a core header field (not shown), the core header field describing the GFP field, in particular the length of the payload. Further, each GFP client data frame $31a$, $31b$, $31c$ comprises a payload area, with the payload area having a payload header $31.1a$, $31.1b$, $31.1c$ and a payload information field $31.2a$, $31.2b$, $31.2c$. The client packets $30a$, $30b$, $30c$ are mapped to the payload information fields $31.2a$, $31.2b$, $31.2c$.

The GFP idle frames 32 (forming special GFP control frames) between the GFP client data frames $31a$, $31b$, $31c$ comprise core header fields but no payload area and have a length of 4 bytes each.

The GFP idle frames 32 between two subsequent GFP client data frames 31a, 31b, 31c are counted by a counter. The counter value is stored into a spare field of the GFP payload header of the GFP client data frame directly following the respective idle period being formed by the counted GFP idle frames 32. In particular, the counter value may be stored in a spare field of the extension header as part of the payload header. Alternatively, one may define a new extension header type since the extension header identifier (EXI) field allows further type definitions. The size of the extension header is not fixed but may vary between 0 and 58 bytes in dependency of the type.

Instead of storing the counter value in the GFP payload header 31.1a, 31.1b, 31.1c, the counter value may be stored in the GFP core header or in an extended GFP core header.

Further, the GFP idle frames are removed from the bit stream. Both the step of counting left out idle frames and the step of removing the idle frames are not part of the conventional GFP as defined in the ITU-T G.7041 recommendation. Thus, in this embodiment a modified GFP is performed.

The GFP client data frames 31a, 31b, 31c comprising the numbers of left out GFP idle frames in the payload header fields 31.1a, 31.1b, 31.1c (see "header*" comprising the number of left out idle frames, as illustrated in FIG. 4) are mapped directly one after another in a container 33, e.g. a burst container 33.

When transmitting the container 33 via various nodes of the network, the payload of the container 33, i.e. the packets 31a, 31b and 31c and its headers are not visible for the network nodes, thereby reducing the effort for header processing since only the header (not shown) of the container 33 and not the headers of the encapsulated packets needs to be processed.

After transmission via the network, the process is reversed at the egress node, i.e. at the unloading stage the packet arrival process is mimicked by reestablishing the corrected departed distances as stored in the header fields 31.1a, 31.1b, 31.1c. The correct number of idle frames is reproduced based on the transmitted counter value of left out idle frames as stored in the payload header fields 31.1a, 31.1b, 31.1c and before the packet itself is released from the container for further transmission. The correct number of idle frames are inserted between the received GFP client data frames 31a, 31b, 31c, thereby reconstructing the timing at the ingress node. Finally, the client packets 30a, 30b, 30c are demapped from the GFP encoded bit steam with reconstructed timing. The departure timing of the client packets 30a, 30b, 30c for transmission via the access network essentially corresponds to the arrival timing of the client packets 30a, 30b, 30c at the ingress node.

As discussed above, variable traffic load at the ingress node of such network further results in variable accumulation times for accumulating packets assigned to a container. This uncertainty in the accumulation time results in temporal variations of the delay between subsequent containers at the egress node and thus in jitter of packet arrival after de-aggregation. Such variation in the accumulation time due to traffic variations may be compensated as discussed below in a second embodiment of the inventive method. As a result not only the relative timing of packets in the same container but also the relative timing of packets in different containers is reconstructed at the egress node.

Figure 5:
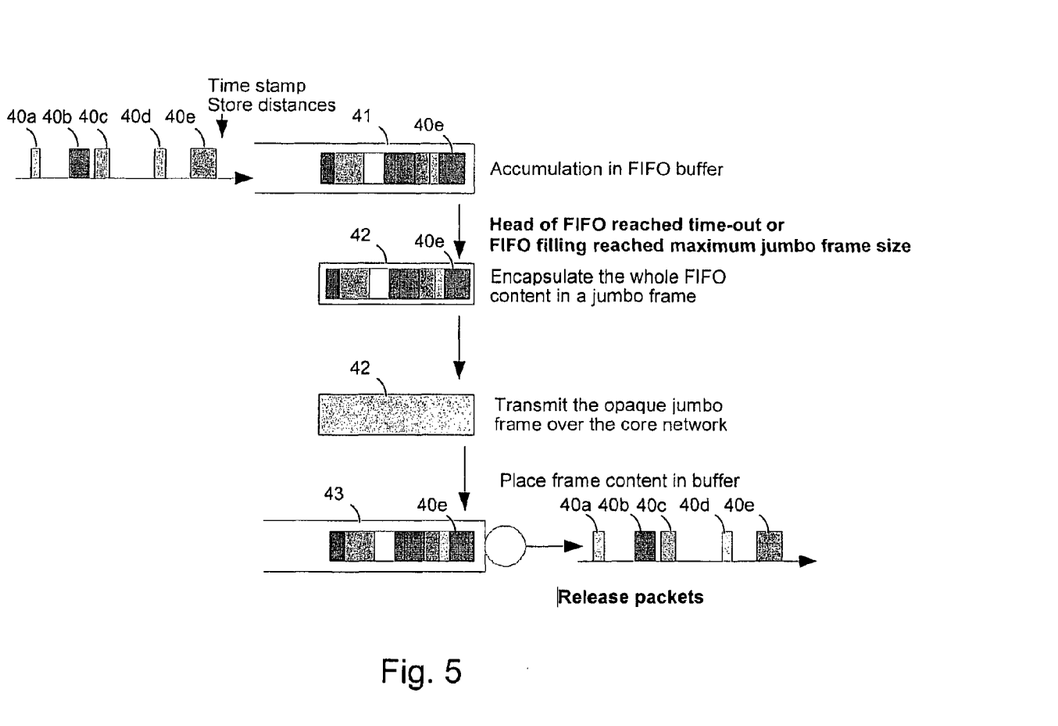
FIG. 5 illustrates a second embodiment of the inventive method.

The second embodiment of the inventive method as illustrated in FIG. 5 performs aggregation of client packets into containers and de-aggregation of client packets from a transmitted container by the following steps:

1. At an ingress node of a high speed packet transport network, incoming client packets 40a-40e from various sources are time stamped.
2. The incoming client packets 40a-40e are accumulated by storing the packets 40a-40e in a first FIFO buffer 41 at the egress node.
3. When either the time-out period $T_o$ is reached for the first packet 40e in the first FIFO buffer 41 (in case of very low load), or the filling of the first FIFO buffer 41 reaches the maximum container frame size (in case of normal or heavy load), the following steps are performed:
   3.1 The whole content of the first FIFO buffer 41 is put in a container frame 42 (e.g. an Ethernet jumbo frame) and the FIFO buffer 41 is emptied.
   3.2 Timing information according to the time stamps is stored in the container frame 42, e.g. arrival distances between packets, in particular between subsequent packets, or distances between the end of a packet and the beginning of the next packet. This may be done by storing the timing information in the packets, e.g. as discussed in connection with FIG. 4 by storing the timing information (here the number of omitted idle frames) in the modified headers of the packets.
   3.3 Timing information of the first packet 40e, e.g. the arrival distance of the first packet 40e, is set to the non-elapsed portion of the time-out period (i.e. to the remainder of the time-out period). The non-elapsed portion of the time-out period is zero if time-out has been reached.
4. Then the container frame 42 is transmitted over the high speed core network. At the switching nodes of the high speed core network, the content of the container 42, in particular the headers of the packets, is not visible.
5. At the receiving egress node, the content of the container 42 is placed into a second FIFO buffer 43. The packets 40a-40e are released according to the stored distances, including the first packet which may be either exhibit a zero remainder or non-zero remainder of the time-out period. In case of a zero remainder, the first packet 40e is released immediately and the other packets 40a-40d are released at the stored distances. In case of a non-zero remainder, the first packet 40a is released after lapsing of the remainder of the time-out period and the other packets 40a-40d are released at the stored distances.

In case the head of the FIFO buffer 41 reaches time-out, the delivery is time-out controlled. In case the filling of the first FIFO buffer 42 reaches the maximum jumbo frame size, the delivery is frame size controlled.

However, in both scenarios, each packet 40a-40e has to wait in the first 41 and second 43 FIFO buffers together for the constant time-out period $T_o$. This is explained below with reference to several examples.

If a first packet arrives at time $t_1$ in an empty first FIFO buffer 41, then in case of a time-out controlled scenario, the first packet waits there until time $t=t_1+T_o$. The waiting time of the first packet in the first FIFO buffer 41 is $\Delta t^{(1)}=T_o$. The relative distance for this first packet is set to the remainder of the time-out period $T_o$, i.e. to 0. After transmission, the first packet is released immediately from the second FIFO buffer 43, i.e. the waiting time of the first packet in the second FIFO buffer 43 is $\Delta t^{(2)}=0$. So, its total waiting time is $\Delta t=\Delta t^{(1)}+\Delta t^{(2)}=T_o$.

If a second packet arrives later then the first packet at a time $t_2$ (the first packet arrived at $t_1$), than the second packet waits there until the first packet is timed out, i.e. until $t=t_1+T_o$. The second packet's waiting time in the first FIFO buffer 41 is $\Delta t^{(1)}=t-t_2=(t_1+T_o)-t_2=T_o-(t_2-t_1)$. At the receiving side only the first packet is released immediately. The subsequent second packet is released from the second FIFO buffer 43 according to the arrival distance $t_2-t_1$ relative to the first packet, i.e. after a waiting time of $\Delta t^{(2)}=t_2-t_1$. Thus, the total waiting time is $\Delta t=\Delta t^{(1)}+\Delta t^{(2)}=T_o-(t_2-t_1)+(t_2-t_1)=T_o$, which is constant.

Identical waiting times occur in case of a frame-size controlled scenario. Assume a first packet arriving at time $t_1$ into an empty first FIFO buffer 41, which is subsequently completely filled before the time-out period lapses. The first FIFO buffer 41 is filled at a time t, with $t<t_1+T_0$. In this case the waiting time in the first buffer 41 is $\Delta t^{(1)}=t-t_1<T_0$. The relative distance for this first packet is set to the remainder of the time-out period $T_0$, i.e. to $T_0-\Delta t^{(1)}$. At the receiving side, after reception of the container, the first packet has to wait for the relative distance $\Delta t^{(2)}=T_0-\Delta t^{(1)}$ which is non-zero in this case. Thus, the total waiting time is again $\Delta t=\Delta t^{(1)}+\Delta t^{(2)}=\Delta t^{(1)}+(T_0-\Delta t^{(1)})=T_0$. The remaining packets are released relative to the first packet according to the timing at the ingress node; the total waiting times of the remaining packets is also $\Delta t=\Delta t^{(1)}+\Delta t^{(2)}=T_0$.

As a matter of course, it should be noted that the total waiting time for all packets may be optionally increased by an additional constant delay. E.g. in case of a time-out controlled delivery the first packet is not released immediately but after an additional constant time period.

A constant delay $T_0$ for any packet, no matter of the actual packet size, density, traffic load or container granularity, is equivalent to a fiber delay on the fiber optic cable. Network applications outside of the container switched core cannot distinguish between both delay contributions.

As an dimensioning example for the second embodiment, one may assume a 10 Gbit/s Ethernet link and encapsulation of client packets into Ethernet jumbo frames having a size of 9.6 kbyte. The maximum packet rate can be calculated as the link capacity divided by the smallest packet size. Without aggregation of packet into the jumbo frames and assuming a smallest packet size of 64 bytes in case of the TCP ACK packet, the maximum packet rate in a line card of the Ethernet link would be 10 Gbit/s/(64 byte 8 bit/byte)=19 Mpps (packets per second). With aggregation of the client packets into jumbo frames, the maximum packet rate can be calculated as 10 Gbit/s/(9.6 kbyte*8 bit/byte)=130 kpps, i.e. link capacity divided by jumbo frame size of 9.6 kbyte. Thus, aggregation into jumbo frames results in a relaxation of the packet processing by a factor of more than 100.

When setting the time-out period $T_0$ to $T_0=1$ ms, such time-out period is roughly equivalent to the delay of 200 km additional fiber distance (end-to-end, not between switching nodes of the network) or 1.25 Mbyte queue size in one of the intermediate switches.

The maximum jumbo frame size would be reached at the ingress node within the time-out period $T_0$, if the traffic load on a particular path would be at least equal to the jumbo frame size divided by the time-out period $T_0$, i.e. (9.6 kbyte 8 bit/byte)/1 ms=77 Mbit/s. This traffic is less than 1/100 of the link capacity. Thus, only in case of very low traffic, the delivery is time-out controlled.

The invention claimed is:

1. A method of transmitting packets via a packet transport network, the method comprising the steps of: at an ingress node of the network, receiving and accumulating packets of one or more client signals, with a variable traffic load of said packets; determining timing information characterizing the timing of the received packets; and mapping the accumulated packets into a container so that in case of low traffic load, packets that are well separated upon arrival at the ingress node are accumulated together in the container and appear to an egress node of the network as a burst of packets after transmission of the container via the transport network, and so that said variable traffic load at the ingress node results in variable times for accumulating packets for the containers, with variations of delay between containers, and in jitter of packet arrival at the egress node; wherein the earliest received packet to be transmitted in a respective container waits during the accumulation of packets for a first time period at the ingress node; transmitting the container and the timing information via the network; and at said egress node of the network, receiving the container, extracting the packets from the container and timing the packets for further transmission based on the timing information; and causing the earliest received packet to wait at the egress node for a second time period such that the sum of the first and second periods is an essentially constant time period, the ratio between the first time period at the ingress node and the second time period at the egress node being dependent on the load of the ingress node.

2. The method of claim 1, further comprising the step of:
monitoring whether a predetermined time-out period is reached at the ingress node for the earliest received packet to be transmitted in the container.

3. The method of claim 2, further comprising the step of:
monitoring whether the accumulated packets at the ingress node reach a predetermined portion of the container capacity;
wherein at the ingress node the container is prepared for transmission when the predetermined time-out period is reached for the earliest packet, or when the accumulated packets reach a predetermined portion of the container capacity; and
wherein at the egress node the earliest packet is timed based on the non-elapsed portion of the time-out period and the remaining packets in the container are timed based on the timing information, thereby essentially reproducing the relative timing of the packets to each other.

4. The method of claim 2, further comprising the steps of:
at the ingress node, storing the packets in a first buffer; and
at the egress node, storing the content of the received container in a second buffer,
wherein it is monitored whether the predetermined time-out period is reached for the earliest packet for the container in the first buffer, and
wherein the content of the first buffer for the container is prepared for transmission when the predetermined time-out period has lapsed for the earliest packet.

5. The method of claim 4, further comprising the step of:
monitoring whether the first buffer reaches a predetermined filling size;
wherein the content of the first buffer is processed for transmission when the first buffer reaches the predetermined filling size, and
wherein the earliest packet is released from the second buffer timed based on the non-elapsed portion of the time-out period and the remaining packets of the container are released from the second buffer timed based on the timing information, thereby essentially reproducing the relative timing of the packets to each other.

6. The method of claim 3, wherein the transmitted timing information related to the earliest packet indicates the non-elapsed portion of the time-out period.

7. The method of claim 1, wherein the container is an Ethernet jumbo frame.

8. The method of claim 1, wherein the determining and mapping steps comprise the steps of:

encoding the received packets by means of a modified Generic Framing Procedure, GFP, wherein GFP specific idle frames are left out; and counting left out idle frames.

9. The method of claim 8, wherein the encoding step comprises the steps of:

generating a data stream essentially pursuant to the GFP, with the data stream having GFP specific idle frames; and removing the idle frames.

10. The method according to claim 8, wherein the determining and mapping steps comprise the step of storing the numbers of left out idle frames in spare fields of GFP headers.

11. The method of claim 10, wherein the number of left out idle frames is stored in the GFP header of the packet directly following the respective left out idle frames.

12. The method of claim 8, wherein the timing step comprises the step of inserting idle frames as indicated by the numbers of left out idle frames.

13. A packet transport network, comprising: at an ingress node of the network, a first network element comprising: means for receiving and accumulating packets of one or more client signals, with a variable traffic load of said packets, to be transmitted via the network; determining means for determining timing information characterizing the timing of the received packets; mapping means for mapping the accumulated packets into a container so that in case of low traffic load, packets that are well separated upon arrival at the ingress node are accumulated together in the container and appear to an egress node of the network as a burst of packets after transmission of the container via the transport network, and so that said variable traffic load at the ingress node results in variable times for accumulating packets for the containers, with variations of delay between containers, and in jitter of packet arrival at the egress node, wherein the earliest received packet to be transmitted in a respective container waits during the accumulation of packets for a first time period at the ingress node; transmitting means for transmitting the container and the timing information via the network; and at said egress node of the network, a second network element comprising: receiving means for receiving the container as generated by the first network element at the ingress node of the network; and extracting means for extracting the packets from the container and timing means for timing the packets for further transmission based on the timing information, said timing means causing the earliest received packet to wait a second time period at the egress node such that the sum of said first and second time periods is an essentially constant time period, the ratio between the first time period at the ingress node and the second time period at the egress node being dependent on the load of the ingress node.

* * * * *